US010992900B1

(12) United States Patent
Mattioli et al.

(10) Patent No.: US 10,992,900 B1
(45) Date of Patent: Apr. 27, 2021

(54) OSCILLATING VIDEO REFRESH

(71) Applicant: Goldman Sachs & Co. LLC, New York, NY (US)

(72) Inventors: Michael Mattioli, Staten Island, NY (US); Frederick Biga, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 16/844,320

(22) Filed: Apr. 9, 2020

(51) Int. Cl.
*H04N 5/913* (2006.01)
*G06F 21/84* (2013.01)

(52) U.S. Cl.
CPC ............. *H04N 5/913* (2013.01); *G06F 21/84* (2013.01)

(58) Field of Classification Search
USPC .................................................. 386/200–234
See application file for complete search history.

(56) References Cited

U.S. PATENT DOCUMENTS

2018/0278647 A1* 9/2018 Gabaev ............... H04L 63/1466
2020/0117782 A1* 4/2020 Lee .................... H04N 21/4415

* cited by examiner

*Primary Examiner* — Hung Q Dang
(74) *Attorney, Agent, or Firm* — Fenwick & West LLP

(57) ABSTRACT

A system and a method are disclosed describing a mechanism for preventing recording of security sensitive media content when that content is displayed on a screen. The mechanism includes selecting two refresh rates for a display and oscillating between those two refresh rates thereby preventing a recording device's recording frame rate from synchronizing with the display device's refresh rate. As a result, anything recorded by the recording device will be distorted.

20 Claims, 5 Drawing Sheets

OSCILLATING VIDEO REFRESH

TECHNICAL FIELD

This disclosure generally relates to media content security, and more particularly to preventing recording of security sensitive media content when that media content is displayed on a screen.

BACKGROUND

When media content is being displayed on a screen (e.g., played back on a display screen), that content can be recorded by an unauthorized recording device. In instances when the content is security sensitive, recording is not desirable. Currently available solutions include placing a privacy screen onto the display which is a plastic covering that obscures what is displayed on the screen when viewed at an angle. Thus, privacy screens are only effective when the recording device is placed at an angle relative to the screen and is not so effective when the recording device is in front of the screen (even if the recording device is at a great distance). Furthermore, privacy screens make the screen darker and generally interfere with viewing media content.

SUMMARY

This disclosure describes a mechanism for preventing recording of security sensitive or otherwise private media content when that media content is displayed on a screen (e.g., a computer monitor). The mechanism includes selecting two or more refresh rates for a display and oscillating between those refresh rates thereby preventing a recording device's recording frame rate from synchronizing with the display device's refresh rate. As a result, anything recorded by the recording device will appear distorted.

To this end and others, a recording prevention system may determine that security sensitive media content has been requested to be displayed. Responsive to determining that the security sensitive media content has been requested to be displayed, the recording prevention system determines a first refresh rate for displaying the security sensitive media content and a second refresh rate for displaying the security sensitive media content, the second refresh rate differing from the first refresh rate. The recording prevention system transmits a first command to a display device to change a previously set refresh rate to the first refresh rate. Responsive to determining that a threshold amount of time has elapsed since transmitting the first command, transmitting a second command to the display device to change the first refresh rate to the second refresh rate. The recording prevention system may keep transmitting the commands one after the other while the security sensitive media content is displayed on the display device. Each command may be sent after the threshold amount of time passes from the previous command.

In some embodiments, the recording prevention system may determine a first refresh rate, a second refresh rate, and a refresh rate update interval, and transmit that information to a display device with a command to begin refresh rate oscillation. The display device may receive the command and set the first refresh rate as a current refresh rate, and then after the refresh rate update interval elapses, set the second refresh rate as the current refresh rate. The display device may continue to update the refresh rates as each update interval elapses.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system that prevents recording of security sensitive media content.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
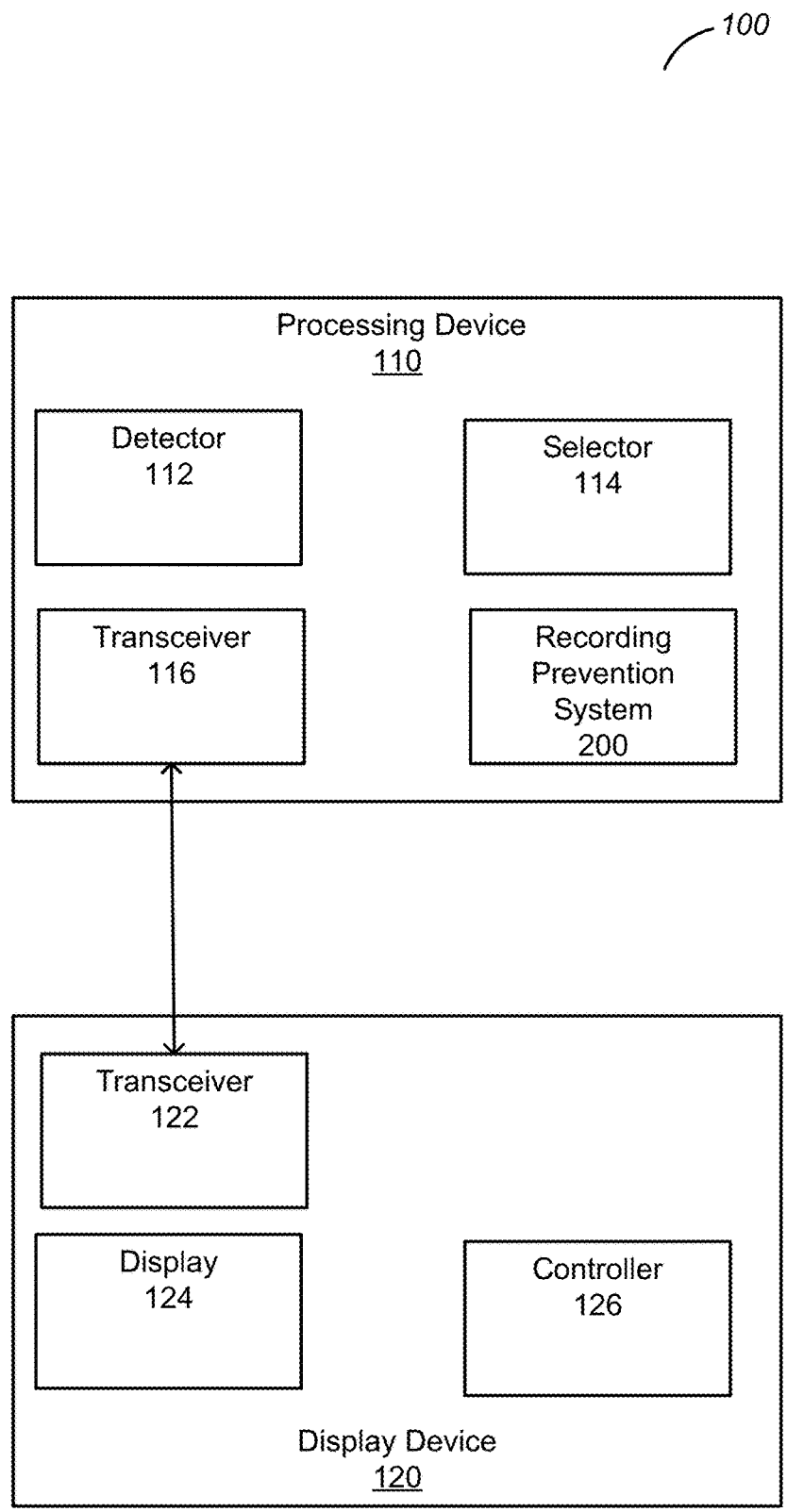

FIG. 1 illustrates one embodiment of a system that prevents recording of security sensitive content. System 100 includes a processing device 110 and a display device 120. Processing device 110 may be coupled with detector 112, selector 114, and transceiver 116. In some embodiments, the detector, selector, and transceiver may share a housing or a chassis with the processing device 110. However, each of detector 112, selector 114, and transceiver 116 may be coupled with the processing device in another way. In some embodiments, instead of the transceiver, device 116 may be a transmitter without a receiver. Detector 112 may detect when security sensitive content is requested to be displayed and relay that information to selector 114. Selector 114 may select refresh rates for the display device and transmit that information to transceiver 116. Transceiver 116 may receive the refresh rate or refresh rates and transmit that information to the display device. In some embodiments, the transceiver may also transmit a refresh rate update interval to the display device. As referred to herein, the term "refresh rate" refers to a number of times that a display device (e.g., a monitor) updates with a new image. For example, a refresh rate may be equal to sixty Hertz, seventy-five Hertz, 120 Hertz, or another suitable refresh rate indicating how many times per second the image on the screen is redrawn.

Display device 120 may include transceiver 122, display 124, and controller 126. Transceiver 122 may receive refresh rate data from transceiver 116 and relay that information to controller 126. Controller 126 may execute instructions to set a refresh rate on the display 124 using the received refresh rate information.

Processing device 110 may be a computer, a smart phone, an electronic tablet, or another suitable device. Display device 120 may be a monitor, a smart phone screen, an electronic tablet screen, a television, or another suitable display device. Each of detector 112, selector 114, transceiver 116, transceiver 122, display 124, and controller 126 may include hardware (e.g., circuitry) and/or software components.

Processing device 110 may be coupled with display device 120 using various methods. For example, processing device 110 and display device 120 may be built into one chassis and be connected via a bus or another suitable connection. A smart phone and an electronic tablet are two examples of processing and display devices being built into one chassis. In another example, the processing device and the display device may be in separate enclosures and connected with a wire or wirelessly. A computer with an external monitor is one example of such arrangement.

The recording prevention system 200 may reside on processing device 110 (as shown in FIG. 1), display device 120, or portions of the recording prevention system 200 may reside on each device. For example, if the recording prevention system 200 resides on processing device 110, all actions taken by the recording prevention system 200 may be completed on the processing device and instructions may be transmitted to the display device to modify refresh rates. If, for example, the recording prevention system 200 resides on the display device (not shown), the recording prevention system may receive from the processing device a communication with a security sensitive flag and process that communication to select appropriate refresh rates and oscillate those refresh rates.

Figure 2:
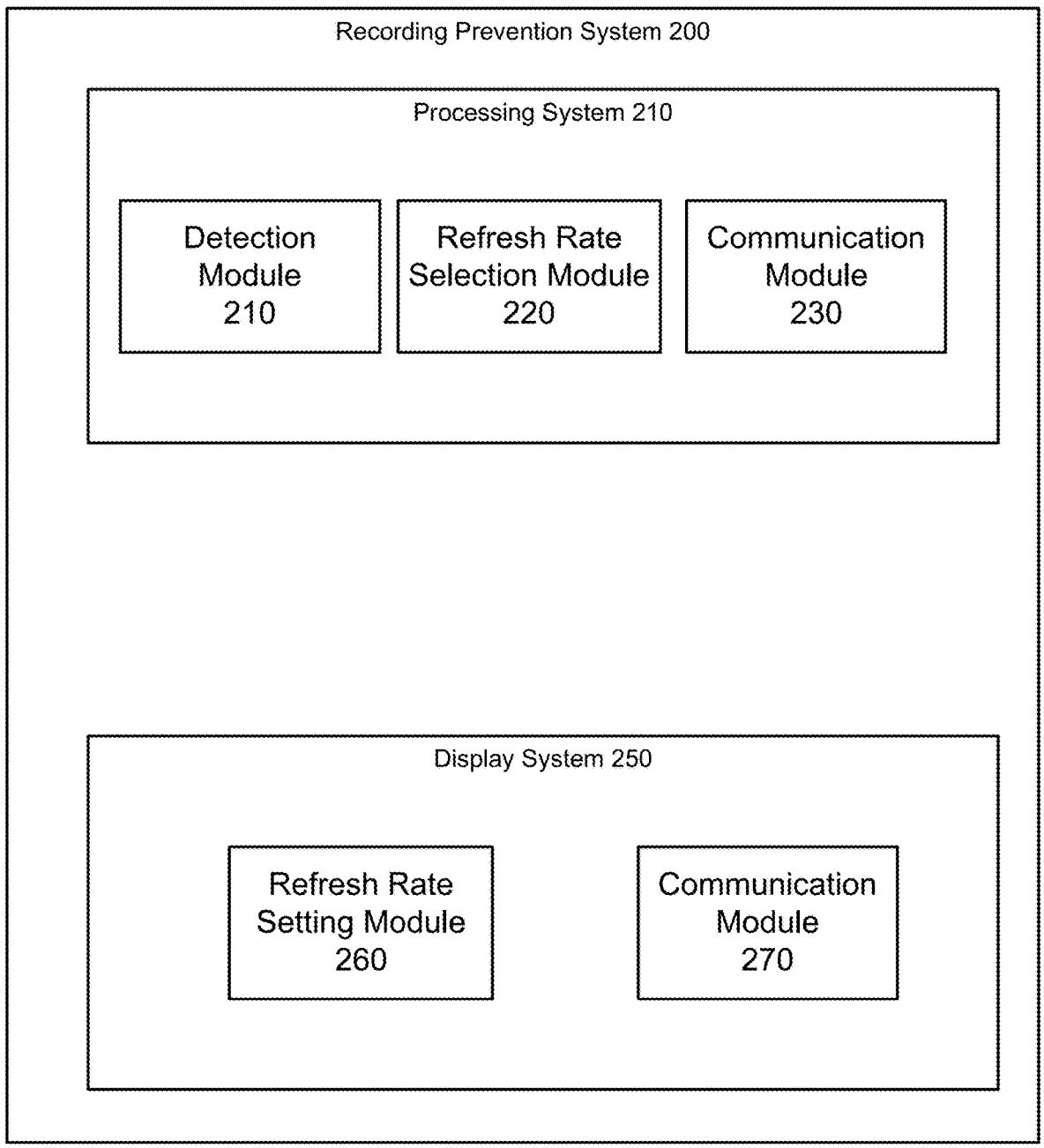
FIG. 2 illustrates one embodiment of exemplary modules of a recording prevention system.

FIG. 2 illustrates one embodiment of exemplary modules of recording prevention system 200. The recording prevention system may include a processing system 210 and a display system 250. Processing system 210 may include a detection module 210, a refresh rate selection module 220, and a communication module 230. Display system 250 may include refresh rate setting module 260 and communication module 270. The modules depicted in FIG. 2 are merely exemplary; fewer or more modules may be included to execute the functions described with respect to recording prevention system 200.

Detection module 210 detects requests for displaying security sensitive media content. Detection module 210 can include hardware (e.g., circuitry), software, or a combination of both. Specifically, the detection module may determine that security sensitive media content has been requested to be displayed. In some embodiments, the detection module may use flags indicating security levels of content to determine whether security sensitive media content has been requested to be displayed. As referred herein, the term security sensitive media content refers to digital content that includes at least video but may also include audio.

For example, the detection module may receive a user input requesting display of media content (e.g., a mouse click selecting content, a keyboard input indicating content, or another suitable input). The detection module may retrieve, from metadata associated with the media content, a flag indicating a security level associated with the media content. Each container (e.g., file) containing media content may be associated with metadata. The metadata may be stored in the container itself and may be used to store a flag indicating whether the media content within the container is security sensitive. As referred herein, the term "metadata" refers to a set of data that describes content and/or characteristics of content within a container (e.g., a file). In some embodiments, the flag may be a level of sensitivity (e.g., represented by numbers, letters, or another suitable system for representing levels). In some embodiments, the flag may be a Boolean value where if the Boolean value indicates "True", the media content is security sensitive and if the Boolean value indicates "False", the media content is not security sensitive. The detection module may determine, based on the flag, that the media content is security sensitive. In some embodiments, the detection module may default to treating all media content as security sensitive, unless otherwise specified. The default may be changed at any time (e.g., by the manufacturer, reseller, administrator, or another suitable party).

Detection module 210 may also detect indications that the security sensitive media content is no longer to be displayed. For example, the detection module may detect a request to display different media content and determine whether the different media content is security sensitive. If the different media content is not security sensitive, the detection module may signal to one or more other modules that refresh rate oscillation should be stopped. The signal may be especially formatted so other modules may identify that the signal indicates that oscillation should be stopped. This signal may be different from a signal that the detection module may send when security sensitive media content is requested to be displayed. In some embodiments, detection module 210 may detect when the security sensitive media content ends and may transmit a signal to one or more other modules, the signal indicating that the security sensitive media content is no longer being displayed.

Detection module 210 may communicate with one or more other modules when relaying data. The detection module may communicate with refresh rate selection module 220. The refresh rate selection module may include hardware (e.g., circuitry) and/or software. The refresh rate selection module may select appropriate refresh rates and communicate those refresh rates to other modules. For example, responsive to determining that the security sensitive media content has been requested to be displayed, the detection module may determine a first refresh rate and a second refresh rate for displaying the security sensitive media content. The refresh rate selection module may determine the refresh rates using various methods.

In some embodiments, the refresh rate selection module may determine a refresh rate based on the refresh rate range of the display device. For example, the refresh rate selection module may transmit a request to the display device for the refresh rate range, or in some embodiments, a maximum refresh rate that the display device is enabled to support and receive, in response, the supported range or the maximum supported refresh rate of the display device. For example, the monitor may support refresh rates up to 120 Hertz. The selection module may select the first refresh rate in the refresh rate range. For example, if the maximum refresh rate of the monitor is 120 Hertz, the selection module may select a refresh rate of 117 Hertz. In some embodiments, the refresh rate selection module may select two refresh rates (e.g., an upper refresh rate and a lower refresh rate). The upper refresh rate may be 117 Hertz and a lower refresh rate may be 111 Hertz.

In some embodiments, the refresh rate selection module may use a random number generator to generate one or more refresh rates. Specifically, the refresh rate selection module may input a subset of the refresh rate range or the maximum refresh rate into a random number generator to generate one or more refresh rates. For example, if the maximum refresh rate of a display device is 120 Hertz, the refresh rate selection module may input that number into a random number generator along with a lower bound for the range to generate one or more refresh rates. In some embodiments, the refresh rate selection module may input a range of 120 Hertz and 100 Hertz into the random number generator to generate a refresh rate of, for example, 117 Hertz. In another example, the refresh rate selection module may input the maximum refresh rate into the random number generator and receive an output of one or more numbers below the 120 Hertz refresh rate (e.g., for the upper and lower refresh rates).

In some embodiments, the refresh rate selection module may use a previously set refresh rate to generate one or more refresh rates for oscillation. Specifically, the refresh rate selection module may retrieve the previously set refresh rate and select an offset number based on the previously set refresh rate. The offset number may be a randomly generated number. The refresh rate selection module may then offset the previously set refresh rate by the offset number to generate the first refresh rate (e.g., an upper refresh rate). To generate the second refresh rate the refresh rate selection module may offset the previously set refresh rate by an additive inverse of the offset number. That is, if the current refresh rate is 60 Hertz, the refresh rate selection module may generate an offset of 6 and generate an upper refresh rate as 66 Hertz and a lower refresh rate as 54 Hertz.

In some embodiments, the refresh rate selection module may use the previously set refresh rate and another refresh rate in the oscillation process. For example, the refresh rate selection module may determine the refresh rate of the display device (e.g., by querying the display device itself or retrieving the refresh rate from the processing device that received the refresh rate from the display device). The refresh rate selection module may store that refresh rate for use in the oscillation process. The refresh rate selection module may determine a new refresh rate to use in the oscillation process (e.g., as discussed above). The refresh rate selection module may transmit the new refresh rate first and then after a threshold time period passes, transmit the previously set refresh rate to the display device. Thus, the display device may be configured to oscillate between the previously set refresh rate the new refresh rate.

In some embodiments, the time between refresh rate changes may also be changed. For example, the refresh rate selection module may also be configured to select a frequency of update. Thus, the new refresh rate may be set after a first time interval, while another refresh rate may be set after a second time interval that is different from the first time interval. The refresh rate selection module may select the time intervals randomly or using another method. For example, the refresh rate selection module may cycle between a number of time intervals. When each time interval has been used, the refresh rate selection module may start the cycle over. In some embodiments, the refresh rate selection module may randomly select from a group of time intervals an interval for the next refresh rate to be set.

In some embodiments, the refresh rate selection module executes some checks against one or more refresh rates that have been selected for the oscillation process. The recording prevention system may include a database that stores identifiers for a plurality of known recording devices and recording frame rate information for each known recording device. For example, if a certain device can record at twenty-four frames per second and sixty frames per second, the recording prevention system may store an identifier of the recording device and both recording capabilities of that device (i.e., twenty-four frames per second and sixty frames per second). As referred to herein, the term "frame rate" refers to a number of images per a second. For example, when a recording device records at twenty-four frames per second, the recording device stores twenty-four images per every second that the recording function is active.

Refresh rate selection module 220 may compare a given refresh rate with each recording frame rate in the database. The comparison may include dividing the refresh rate by the frame rate to determine whether the result is an integer. Thus, the refresh rate selection module may determine whether a given refresh rate is a multiple of a recording frame rate of each known recording device. Responsive to determining that a given refresh rate is a multiple of a recording frame rate of a recording device in a database, the refresh rate selection module may modify the given refresh rate (e.g., offset the refresh rate by a specific number). For example, the refresh rate selection module may select a refresh rate of 72 Hertz. A certain recording device may record at 24 frames per second which is a multiple of 72. In response, the refresh rate selection module may offset the refresh rate by, for example, 6 Hertz to arrive at the refresh rate of 78 Hertz.

Refresh rate selection module 220 may relay the refresh rate information to communication module 230. Communication module 230 may include hardware (e.g., circuitry) and/or software components. For example, the communication module may include a transceiver 116 as described in connection with FIG. 1. The communication module may communicate with a display device (e.g., display device 120 of FIG. 1) to relay refresh rate information to the display device. For example, the communication module may transmit a first command to a display device to change a previously set refresh rate to the first refresh rate. The communication module may be communicating with communication module 270. Communication module 270 may include hardware (e.g., circuitry) and/or software components. For example, the communication module may include transceiver 122 of FIG. 1. The communication module 270 may relay the refresh rate information to refresh rate setting module 260. Refresh rate setting module 260 may include hardware (e.g., circuitry) and/or software components. For example, the refresh rate setting module may include controller 126 of FIG. 1. The refresh rate setting module may use the refresh rate information to instruct the display to update its refresh rate.

Communication module 230, responsive to determining that a threshold amount of time has elapsed since transmitting the first command, may transmit a second command to the display device to change the refresh rate (e.g., from the first refresh rate to a second refresh rate). Communication module 230 may continue sending refresh rate changes in intervals corresponding to the threshold amount of time while the security sensitive media content is being displayed.

In some embodiments, communication module 230 may transmit both refresh rates (e.g., upper refresh rate and lower refresh rate) and a time interval to communication module 270. Communication module 270 may relay that information to refresh rate setting module 260. Based on that information, the refresh rate setting module may oscillate between the first refresh rate and the second refresh rate using the time interval. That is, the refresh rate setting module may swap the first refresh rate with the second refresh rate every time a time interval expires.

In some embodiments, the recording prevention system may use a refresh rate of the display device that is normally used as one of the oscillating refresh rates. For example, the refresh rate selection module may retrieve the refresh rate that the display device is operating at and select another refresh rate as a second refresh rate. That refresh rate may be communicated to the refresh rate setting module which can oscillate between the original refresh rate and a new selected refresh rate. The refresh rate selection module may select the new selected refresh rate by, for example, generating an offset number and offsetting the original refresh rate by that number (e.g., in a positive or negative direction).

In some embodiments, the refresh rate selection module, responsive to determining that the security sensitive media content has been requested to no longer be displayed, transmit a command to the display device to change a current refresh rate to the previously set refresh rate. For example, the refresh rate selection module may have stored the previously set refresh rate in memory. When the security sensitive media content is no longer being displayed, the refresh rate selection module may retrieve that previously set refresh rate and transmit that refresh rate to the display device, thus, stopping oscillation between two refresh rates.

Computing Machine Architecture

Figure 3:
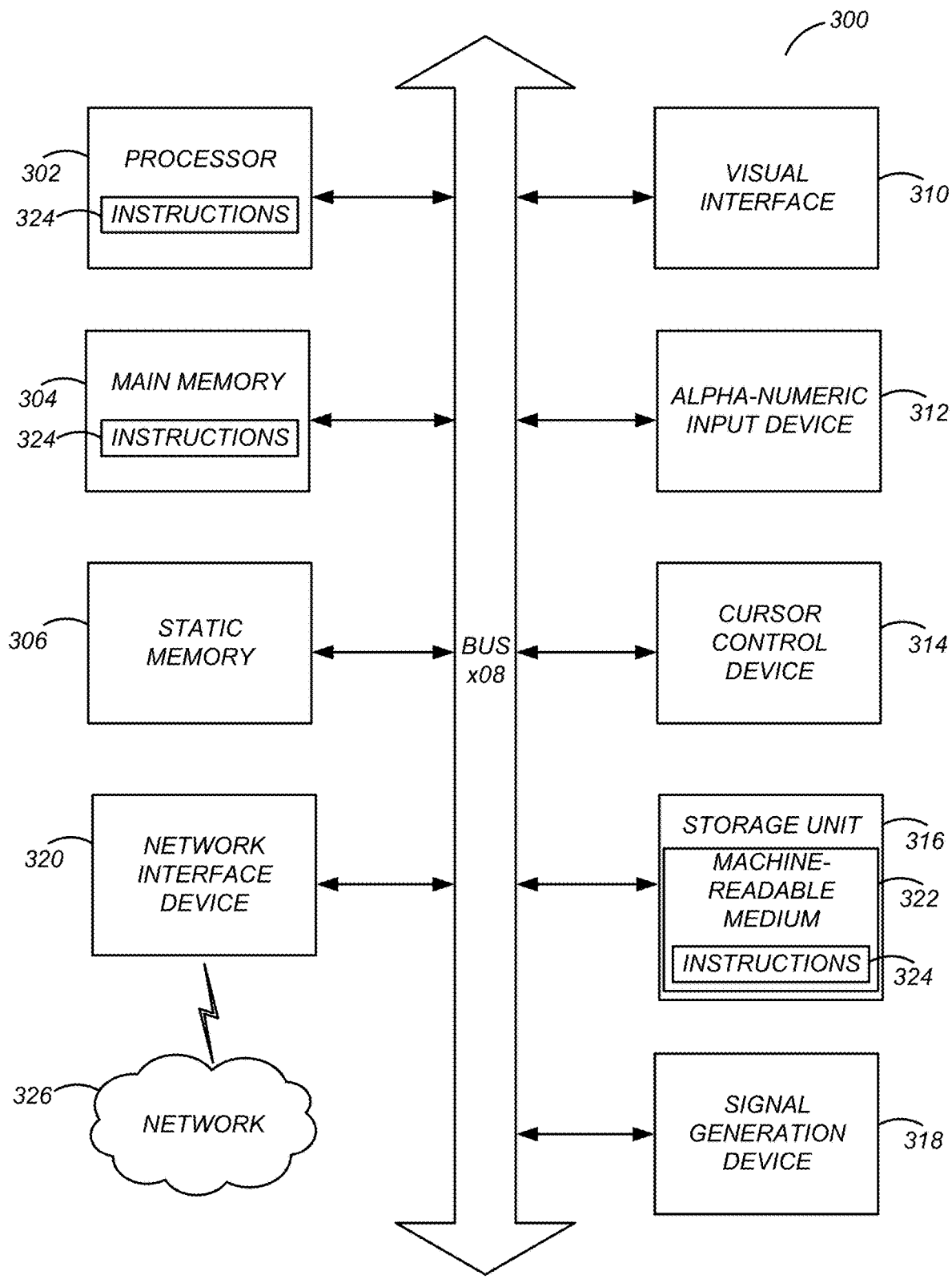
FIG. 3 is a block diagram illustrating components of an example machine able to read instructions from a machine-readable medium and execute them in a processor (or controller).

FIG. 3 is a block diagram illustrating components of an example machine able to read instructions from a machine-readable medium and execute them in a processor (or controller). Specifically, FIG. 3 shows a diagrammatic representation of a machine in the example form of a computer system 300 within which program code (e.g., software) for causing the machine to perform any one or more of the methodologies discussed herein may be executed. The program code may be comprised of instructions 324 executable by one or more processors 302. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 324 (sequential or otherwise) that specify actions to be taken by that machine. Further, while only a single machine is illustrated, the term "machine" shall also be taken to include any collection of machines that individually or jointly execute instructions 324 to perform any one or more of the methodologies discussed herein.

The example computer system 300 includes a processor 302 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 304, and a static memory 306, which are configured to communicate with each other via a bus 308. The computer system 300 may further include visual display interface 310. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 310 may include or may interface with a touch enabled screen. The computer system 300 may also include alpha-numeric input device 312 (e.g., a keyboard or touch screen keyboard), a cursor control device 314 (e.g., a mouse, a trackball, a joystick, a motion sensor, or other pointing instrument), a storage unit 316, a signal generation device 318 (e.g., a speaker), and a network interface device 320, which also are configured to communicate via the bus 308.

The storage unit 316 includes a machine-readable medium 322 on which is stored instructions 324 (e.g., software) embodying any one or more of the methodologies or functions described herein. The instructions 324 (e.g., software) may also reside, completely or at least partially, within the main memory 304 or within the processor 302 (e.g., within a processor's cache memory) during execution thereof by the computer system 300, the main memory 304 and the processor 302 also constituting machine-readable media. The instructions 324 (e.g., software) may be transmitted or received over a network 326 via the network interface device 320.

While machine-readable medium 322 is shown in an example embodiment to be a single medium, the term "machine-readable medium" should be taken to include a single medium or multiple media (e.g., a centralized or distributed database, or associated caches and servers) able to store instructions (e.g., instructions 324). The term "machine-readable medium" shall also be taken to include any medium that is capable of storing instructions (e.g., instructions 324) for execution by the machine and that cause the machine to perform any one or more of the methodologies disclosed herein. The term "machine-readable medium" includes, but not be limited to, data repositories in the form of solid-state memories, optical media, and magnetic media.

Figure 4:
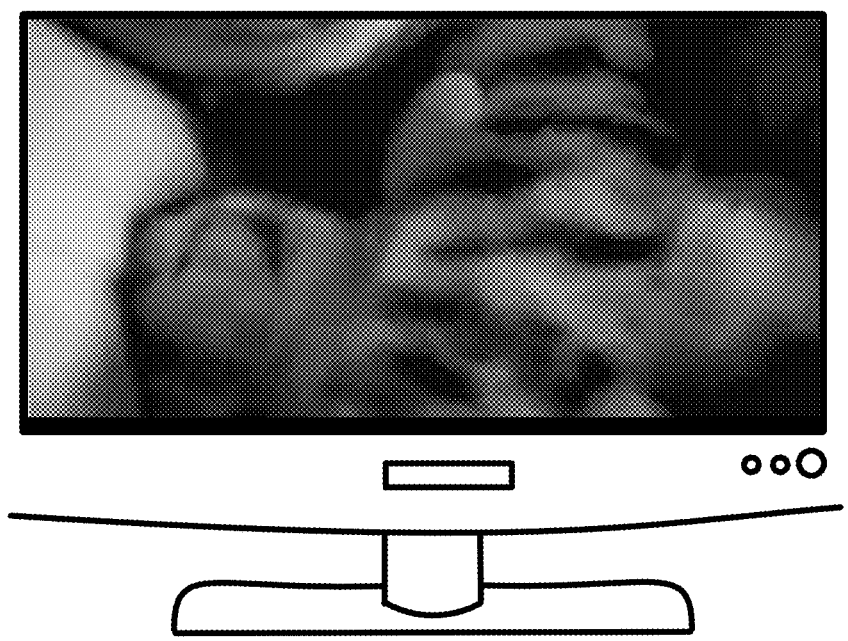
FIG. 4 illustrates a screen shot of media content recorded while the recording prevention system was active.

FIG. 4 illustrates a screen shot of media content recorded while the recording prevention system was active. As illustrated by FIG. 4, when output, the recorded media content appears distorted and difficult to consume.

Figure 5:
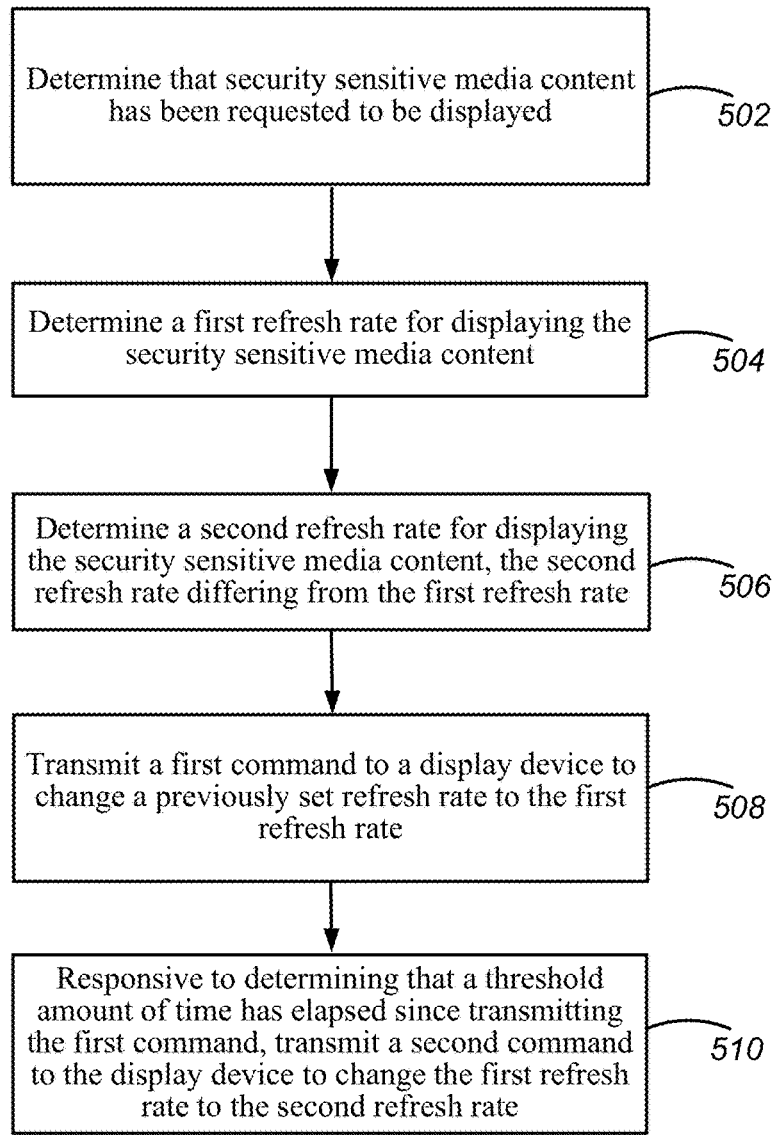
FIG. 5 illustrates one embodiment of an exemplary flow chart for preventing recording of media content displayed on a display screen.

FIG. 5 is exemplary flow chart for a method for preventing recording of media content displayed on a display screen. At 502, the recording prevention system determines that security sensitive media content has been requested to be displayed. For example, the recording prevention system may receive a flag from the operating system of a processing device (e.g., a client computing device) that a file including media content that is security sensitive has been selected for display.

At 504, the recording prevention system determines a first refresh rate for displaying the security sensitive media content. For example, as described above, the recording prevention system may retrieve the current refresh rate of the display device and generate an offset from that refresh rate (e.g., 5 Hertz). Based on the current refresh rate and the offset, the recording prevention system may generate a first refresh rate. For example, the recording prevention system may subtract the offset from the current refresh rate.

At 506, the recording prevention system determines a second refresh rate for displaying the security sensitive media content, the second refresh rate differing from the first refresh rate. To continue with the example above, the recording prevention system may use the offset and the current refresh rate to generate the second refresh rate. For example, the recording prevention system may add the offset to the current refresh rate.

At 508, the recording prevention system transmits a first command to a display device to change a previously set refresh rate to the first refresh rate. For example, the recording prevention system may transmit the first refresh rate from the processing device to the display device as part of the command. The command may indicate to the display device to modify the refresh rate (e.g., to use the refresh rate communicated in the command).

At 510, responsive to determining that a threshold amount of time has elapsed since transmitting the first command, the recording prevention system transmits a second command to the display device to change the first refresh rate to the second refresh rate. For example, the threshold amount of time may be preset and stored in a memory. The recording prevention system may retrieve the threshold amount of time from the memory and use it in the oscillation process. Thus, when the threshold amount of time elapses, the recording prevention system may transmit the second command (e.g., from the processing device to the display device). In some embodiments, the second command may be formatted in the same manner as the first command and include the second refresh rate.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for preventing recording of security sensitive media content when that content is displayed on a screen through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for preventing recording of a display screen, the method comprising:
   determining that security sensitive media content has been requested to be displayed;
   responsive to determining that the security sensitive media content has been requested to be displayed:
      determining a first refresh rate for displaying the security sensitive media content;
      determining a second refresh rate for displaying the security sensitive media content, the second refresh rate differing from the first refresh rate;
   transmitting a first command to a display device to change a previously set refresh rate to the first refresh rate; and
   responsive to determining that a threshold amount of time has elapsed since transmitting the first command, transmitting a second command to the display device to change the first refresh rate to the second refresh rate.

2. The method of claim 1, further comprising:
   determining that the security sensitive media content has been requested to no longer be displayed;
   responsive to determining that the security sensitive media content has been requested to no longer be displayed, transmitting a third command to the display device to change a current refresh rate to the previously set refresh rate.

3. The method of claim 1, wherein determining the first refresh rate for displaying the security sensitive media content comprises:
   determining a refresh rate range for the display device; and
   generating the first refresh rate in the refresh rate range.

4. The method of claim 3, wherein generating the first refresh rate in the refresh rate range comprises inputting a subrange of the refresh rate range into a random number generator.

5. The method of claim 3, wherein generating the first refresh rate in the refresh rate range comprises:
   retrieving the previously set refresh rate;
   selecting an offset number based on the previously set refresh rate; and offsetting the previously set refresh rate by the offset number to generate the first refresh rate.

6. The method of claim 5, wherein determining the second refresh rate for displaying the security sensitive media content comprises offsetting the previously set refresh rate by an additive inverse of the offset number.

7. The method of claim 1, wherein determining that the security sensitive media content has been requested to be displayed comprises:
receiving a user input requesting display of media content;
retrieving, from metadata associated with the media content, a flag indicating a security level associated with the media content; and
determining, based on the flag, that the media content is security sensitive.

8. The method of claim 1, further comprising:
comparing the first refresh rate with each of plurality of recording frame rates, wherein each of the plurality of recording frame rates is associated with a known recording device;
determining, based on the comparing, whether the first refresh rate is a multiple of a recording frame rate of the plurality of recording frame rates; and
responsive to determining that the first refresh rate is a multiple of a recording frame rate of the plurality of recording frame rates, modifying the first refresh rate.

9. The method of claim 1, wherein determining the second refresh rate for displaying the security sensitive media content comprises retrieving the previously set refresh rate.

10. A non-transitory computer-readable medium comprising memory with instructions encoded thereon for preventing recording of a display screen, the instructions causing one or more processors to perform operations when executed, the instructions comprising instructions to:
determine that security sensitive media content has been requested to be displayed;
responsive to determining that the security sensitive media content has been requested to be displayed:
determine a first refresh rate for displaying the security sensitive media content;
determine a second refresh rate for displaying the security sensitive media content, the second refresh rate differing from the first refresh rate;
transmit a first command to a display device to change a previously set refresh rate to the first refresh rate; and
responsive to determining that a threshold amount of time has elapsed since transmitting the first command, transmit a second command to the display device to change the first refresh rate to the second refresh rate.

11. The non-transitory computer-readable medium claim 10, wherein the instructions further comprise instructions to:
determine that the security sensitive media content has been requested to no longer be displayed;
responsive to determining that the security sensitive media content has been requested to no longer be displayed, transmit a third command to the display device to change a current refresh rate to the previously set refresh rate.

12. The non-transitory computer-readable medium of claim 10, wherein the instructions to determine the first refresh rate for displaying the security sensitive media content further comprise instructions to:
determine a refresh rate range for the display device; and
generate the first refresh rate in the refresh rate range.

13. The non-transitory computer-readable medium of claim 12, wherein the instructions to generate the first refresh rate in the refresh rate range further comprise instructions to input a subrange of the refresh rate range into a random number generator.

14. The non-transitory computer-readable medium of claim 12, wherein the instructions to generate the first refresh rate in the refresh rate range further comprise instructions to:
retrieve the previously set refresh rate;
select an offset number based on the previously set refresh rate; and
offset the previously set refresh rate by the offset number to generate the first refresh rate.

15. The non-transitory computer-readable medium of claim 14, wherein the instructions to determine the second refresh rate for displaying the security sensitive media content comprise instructions to offset the previously set refresh rate by an additive inverse of the offset number.

16. The non-transitory computer-readable medium of claim 10, wherein the instructions to determine that the security sensitive media content has been requested to be displayed comprise instructions to:
receive a user input requesting display of media content;
retrieve, from metadata associated with the media content, a flag indicating a security level associated with the media content; and
determine, based on the flag, that the media content is security sensitive.

17. The non-transitory computer-readable medium of claim 10, wherein the instructions further comprise instructions to:
compare the first refresh rate with each of plurality of recording frame rates, wherein each of the plurality of recording frame rates is associated with a known recording device;
determine, based on the comparing, whether the first refresh rate is a multiple of a recording frame rate of the plurality of recording frame rates; and
responsive to determining that the first refresh rate is a multiple of a recording frame rate of the plurality of recording frame rates, modify the first refresh rate.

18. The non-transitory computer-readable medium of claim 10, wherein the instructions to determine the second refresh rate for displaying the security sensitive media content comprise instructions to retrieve the previously set refresh rate.

19. A system for preventing recording of a display screen, the system comprising:
memory with instructions encoded thereon; and
one or more processors that, when executing the instructions, are caused to perform operations comprising:
determining that security sensitive media content has been requested to be displayed;
responsive to determining that the security sensitive media content has been requested to be displayed:
determining a first refresh rate for displaying the security sensitive media content;
determining a second refresh rate for displaying the security sensitive media content, the second refresh rate differing from the first refresh rate;
transmitting a first command to a display device to change a previously set refresh rate to the first refresh rate; and
responsive to determining that a threshold amount of time has elapsed since transmitting the first command, transmitting a second command to the display device to change the first refresh rate to the second refresh rate.

20. The system of claim 19, wherein the operations further comprise:

determining that the security sensitive media content has been requested to no longer be displayed;

responsive to determining that the security sensitive media content has been requested to no longer be displayed, transmitting a third command to the display device to change a current refresh rate to the previously set refresh rate.

\* \* \* \* \*

UNITED STATES PATENT AND TRADEMARK OFFICE
CERTIFICATE OF CORRECTION

| | | |
|---|---|---|
| PATENT NO. | : 10,992,900 B1 | Page 1 of 1 |
| APPLICATION NO. | : 16/844320 | |
| DATED | : April 27, 2021 | |
| INVENTOR(S) | : Mattioli et al. | |

It is certified that error appears in the above-identified patent and that said Letters Patent is hereby corrected as shown below:

In the Claims

In Column 13, in Claim 11, Line 51, after "medium" insert -- of --.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*